July 21, 1959  W. HRYNISZAK  2,895,296
GAS TURBINE POWER PLANT WITH REGENERATOR
Filed Jan. 25, 1952
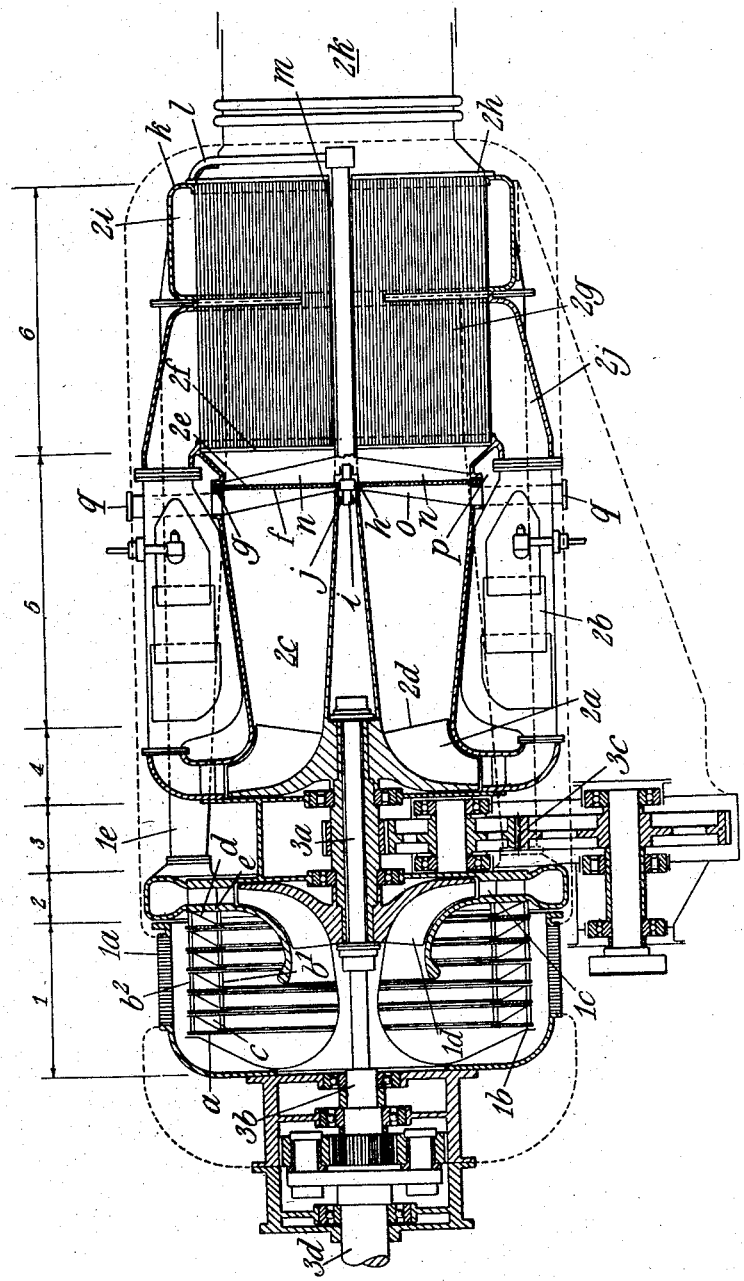
INVENTOR
WALDEMAR HRYNISZAK
BY
ATTORNEY

United States Patent Office 2,895,296
Patented July 21, 1959

2,895,296

GAS TURBINE POWER PLANT WITH REGENERATOR

Waldemar Hryniszak, Cullercoats, Whitley Bay, England, assignor to C. A. Parsons & Company Limited, Newcastle-upon-Tyne, England Application January 25, 1952, Serial No. 268,229

6 Claims. (Cl. 60—39.51)

This invention relates to combustion turbine plants especially for mobile purposes. The invention is not however limited to mobile units. It relates to combustion turbine plants herein usually called gas turbine plants for small output. Some of the purposes for which small gas turbine plants can be used are:

(1) Power-balanced (not providing a useful mechanical output):
  (a) Small jet units;
  (b) Supercharging units for reciprocating oil engines.
(2) Not power-balanced (providing a useful mechanical output):
  (a) Gas turbine units for driving electrical generators; pumps for liquid or air, or other fluids, etc.;
  (b) Gas turbine units for driving the auxiliaries of, say, large power plants (ships, aircraft, and the like).

The present invention deals only with plants in which a useful mechanical output is provided.

The object of the present invention is to provide a combustion turbine plant suitable for small outputs especially in connection with the driving of motor road vehicles either through an electric or hydraulic drive or by means of a mechanical drive or the driving of other comparatively small units for instance in connection with, say, motor cars, pumps and the like, the general range of the horsepower being, say, from 50 to about 200 to 300.

The accompanying diagrammatic drawing which is a longitudinal section illustrates the best arrangement known to us according to the present invention.

According to the form illustrated the entire combustion turbine is more or less cylindrical in shape and may be treated as divided into six main sections. It comprises a single stage centrifugal compressor driven by a single stage centripetal turbine. The drawing is marked with six regions in which:

Region 1 includes a louver, filter arrangement and nozzle of the compressor unit, which preferably is a single centrifugal compressor, as shown;
Region 2 includes the compressor unit;
Region 3 usually comprises the gearing (unless this is arranged at the front of the unit);
Region 4 is similar to Region 2, and includes the turbine unit, preferably a single centripetal turbine, as shown;
Region 5 comprises the combustion chamber or chambers surrounding the diffuser of the turbine;
Region 6 includes the air preheater and the cleaning device for the exhaust gases of the turbine before they enter the hot gas side of the air preheater.

The various parts referred to are in the form shown constructed or arranged as follows:

The air filtering arrangement includes a louver $1a$, filter arrangement $1b$, and nozzle $1c$ of the compressor $1d$, which is a single stage centrifugal radial compressor. Before it enters the compressor, the air is cleaned in the louver and filtered in the filter which is placed after it, in the direction of air flow. The filter proper consists of thin round discs $a$ of felt enclosed in circular inside and outside frames $b^1$ and $b^2$ respectively and spaced in the axial direction by circular caps $c$. A disc is followed by a cap, then another disc, and so on, the whole series together with the end cap $d$ being bolted to a casing $e$ of the compressor.

The air compressor is a single stage centrifugal compressor. After leaving the diffuser vanes of the compressor the compressed air is deflected into a second diffuser $1e$ which connects a scroll outlet of the compressor with an inlet casing of the air preheater cold gas side; the air is again diffused before it enters the heat exchanging part, all of which will be referred to below.

The centripetal turbine unit is a single stage turbine $2a$ of diameter greater than the diameter of the centrifugal compressor to obtain a useful mechanical output here. The hot gases of combustion are led to the periphery of the centripetal turbine through combustion chambers $2b$.

The combustion chambers are arranged axially with respect to the plant as a whole, and are equally distributed over the circumference of the outlet of the turbine diffuser $2c$, the diffuser boundary being $2d$. This diffuser terminates in a cleaning device $2e$ located near the inlet $2f$ of the hot gas side of the preheater or heat exchanger $2g$, which means to say near the inlet of the tube nests arranged in the drum, as referred to below.

As to other parts the other inlets and outlets of the heat exchanger are hot gas side outlet $2h$, cold gas side inlet $2i$, cold gas side outlet $2j$. The general gas outlet is $2k$.

The cleaning device consists of a disc $f$ of wire gauzes supported by outside and inside rings $g$ and $h$. The inside ring $h$ is connected with a shaft $i$ supported by bearings $j$ and is driven, through a reduction gear, by the output shaft of the turbine, or by other suitable means, such as the exhaust gases themselves or the cleaning air. This cleaning air is tapped from the inlet scroll $k$ of the preheater cold gas side by a tapper $l$ and emerges into a second pipe $m$ situated in the middle of the preheater. The latter pipe terminates in one, two or more distributing chambers $n$ the open end of which are close to the gauze. On the other side of the gauze disc is situated the opening of a collecting chamber $o$ located just opposite to the opening of the distributing chamber, so that combustibles blown by the compressed air from the turbine side of the gauze can collect in this chamber and be discharged to the outside through a scroll $p$ and outlet pipes $q$. By this means the inlet of the tube nests is protected from both the dirt of the exhaust gases and any flames caused by after-burning.

The heat exchanging part shown consists of nests of tubes, arranged in an axial direction in the form of a drum. The air flows outside the tubes, crossing the nests in two sections separated by a disc type baffle. This enables the air to turn, near the center of the tube drum, from the first into the second section. The heated air is collected in an outlet casing of the air preheater, the openings of which merge in the openings of the combustion chambers. Reference has already been made to other functions of the heat exchanger.

As regards the gearing, the output shaft is an axial shaft $3a$ and gearing $3b$ may either be arranged on it or in association with it in front of the first or louver section or at $3c$ between the centrifugal compressor and the centripetal turbine. If arranged in front I prefer to use an epicyclic type of gear because this can conveniently be made of cylindrical form keeping the general arrangement cylindrical. The gearing between the centrifugal compressor and the centripetal turbine if place there may be of any suitable form brought out through the casing to a convenient external driving shaft. It is sometimes convenient to have the main power output from one of these places and a power output for driving auxiliaries from the other.

Shaft $3a$ may be considered a high speed output shaft and shaft $3d$ a low speed output shaft.

The general operation of the unit is on lines similar to that of usual gas or combustion turbine plants, that is to say air is compressed in the centrifugal compressor, heated in a heat exchanger, burnt in a combustion chamber and drives a centripetal turbine which drives the compressor and of itself or by some other turbine provides useful external mechanical work.

General

The arrangements all use a centrifugal compressor and a centripetal turbine.

At the outlet of the turbine there is a long diffuser reducing velocity therefore increasing pressure, and this must be of the highest possible efficiency.

Gas must flow past the heat exchanger tubes at a low velocity. The exit velocity is, say, 100 feet per second or even less.

At the outlet of the turbine, that is the inlet of the diffuser, the velocity may be, say, 400 feet per second or more.

The density is low at the outlet of the centripetal turbine and lower than the inlet of the centrifugal compressor, due to heating of the gases before entering the centripetal turbine. There must be a high velocity at the outlet of the compressor or the diameter of the eye would be impractically great.

There is a pressure loss in the heat exchanger. For small units I must have a high efficiency in the heat exhanger. It is usually about 75%; I propose to provide 80 to 85% at least. This means that in a tubular type exchanger there must be long tubes, hence there is a large pressure drop, so there must be a high initial pressure. The more pressure recovery there is in the diffuser the better, because the higher can be the output of the turbine and therefore the overall efficiency is increased.

I use a single stage air compressor because with a high efficiency heat exchanger the pressure of the entering air must be low for example 2.5 to 3.5 atmospheres.

The use of a heat exchanger is essential for high efficiency especially in those cases where there is a comparatively high hime factor of use, as in a car, as distinct from a low time factor, such as in a stand-by plant. In the latter case low efficiency would be permissible.

In a high efficiency heat exchanger the clearances between tubes is very small.

The mass flow of a plant according to the present invention might be, say, 2 to 8 lbs. per second, but one could go somewhat higher. The centrifugal compressor must be a single stage compressor. The centripetal turbine is also a single stage turbine, but some modification of this is referred to in my later cases. A heat exchanger is essential.

The plant arrangement is important for whilst a heat exchanger provides efficiency, it involves the use of ducts. Such ducts require space and also reduce efficiency, especially in small units.

In the arrangement shown, the ducts may be all operative, apart from being ducts, that is to say they may be operative as diffusers or velocity reducing passages which means pressure increasing passages leading to higher efficiency.

A high efficiency heat exchanger is necessarily bulky, hence to get the plant into a given space the units must be compact. For that reason it is necessary to use the stated compressor and turbine and ducts and to keep everything of a cylindrical shape.

By arranging the heat exchanger as shown various types of exchanger may be used; for instance I may use a regenerative or recuperative type of heat exchanger.

I claim:

1. A combustion turbine plant consisting of the following operative connected sections arranged in the order stated and beginning with an air inlet end, the whole arrangement being approximately cylindrical and the ratio of length to diameter being greater than 1, namely: an air filtering arrangement consisting of a louvre followed by a filtering device inside the louvre and consisting of a plurality of thin discs of filtering material and means supporting them in axially spaced relation; an air compressor of the centrifugal type in which air enters vanes in an axial direction and leaves in a radial direction taking air and through an eye receiving air from the air filtering arrangement; a diffuser system consisting of distributing scrolls situated at the exit from the compressor impeller, a number of straight diffusers connected to the distributing scrolls, having their axes disposed in a plane perpendicular to the axis of the plant and equally spaced apart circumferentially, final diffusers running in an axial direction, and bends connecting the outlets of the straight diffusers to the inlets of the final diffusers; a centripetal turbine arranged mechanically to drive he aforesaid air compressor and in addition to produce energy available for external work; a combustion arrangement comprising combustion chambers disposed in an axial direction and equally distributed over the circumference of the turbine outlet diffuser in the interleaving spaces between the final diffusers of the compressor and arranged so that the outside diameter of the said combustion arrangement is not greater than the outside diameter of the compressor and its radially disposed diffuser arrangement combined; and an air preheater of the recuperative type having a nest of heat exchange tubes and in which the exhaust gases of the turbine travel inside the tubes in an axial direction and compressed air from the compressor is led from the exit of the aforesaid final diffuser of the compressor to an inlet annulus of the air preheater and then flows over the tubes, in a direction perpendicular to the flow of gases from the turbine exhaust inside the tubes, to the center of the nest of tubes and is then directed to an outward radial direction to enter an air exhaust annulus connected with the inlets of the combustion chambers.

2. A combustion turbine plant in accordance with claim 1, having in addition a power shaft in the axis of the plant and gearing driven thereby for transmitting mechanical power provided by the centripetal turbine.

3. A combustion turbine plant in accordance with claim 1, comprising also a cleaning device connected to said turbine outlet diffuser located near the inlet of the hot gas side of the preheater and acting also as a flame trap to prevent flames reaching the matrix of the air preheater.

4. A combustion turbine plant in accordance with claim 3, in which the cleaning device consists of a disc of wire gauze supported by inside and outside rings, means for rotating this disc and means for passing compressed air through it for cleaning it.

5. A combustion turbine plant in accordance with claim 1, in which the gearing is positioned in front of the louver and filter sections.

6. A combustion turbine plant in accordance with claim 1, in which the gearing is positioned between the compressor and turbine impeller.

References Cited in the file of this patent

UNITED STATES PATENTS

| | | |
|---|---|---|
| 2,056,198 | Lasley | Oct. 6, 1936 |
| 2,162,956 | Lysholm | June 20, 1939 |
| 2,476,179 | Cameron | July 12, 1949 |
| 2,491,462 | Wood | Dec. 13, 1949 |
| 2,540,526 | Howell | Feb. 6, 1951 |
| 2,553,867 | Parducci | May 22, 1951 |
| 2,591,540 | Grylls | Apr. 1, 1952 |